C. D. HAVENSTRITE.
OSCILLATING TYPE COMPRESSOR.
APPLICATION FILED JULY 30, 1918.
1,346,404.
Patented July 13, 1920.
2 SHEETS—SHEET 1.
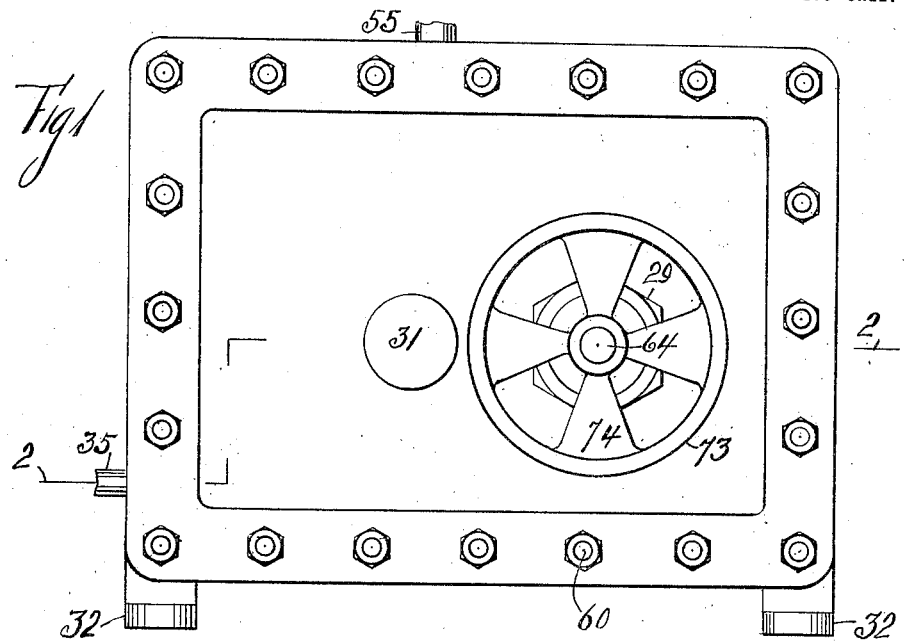
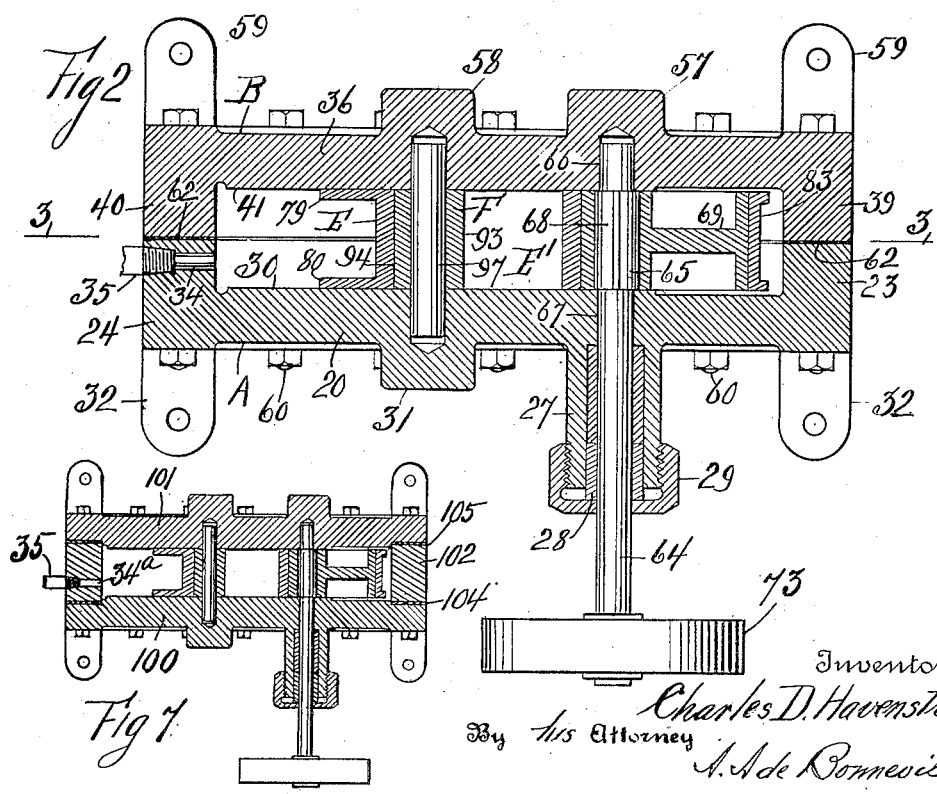
Inventor
Charles D. Havenstrite
By his Attorney
A. A. de Bonneville

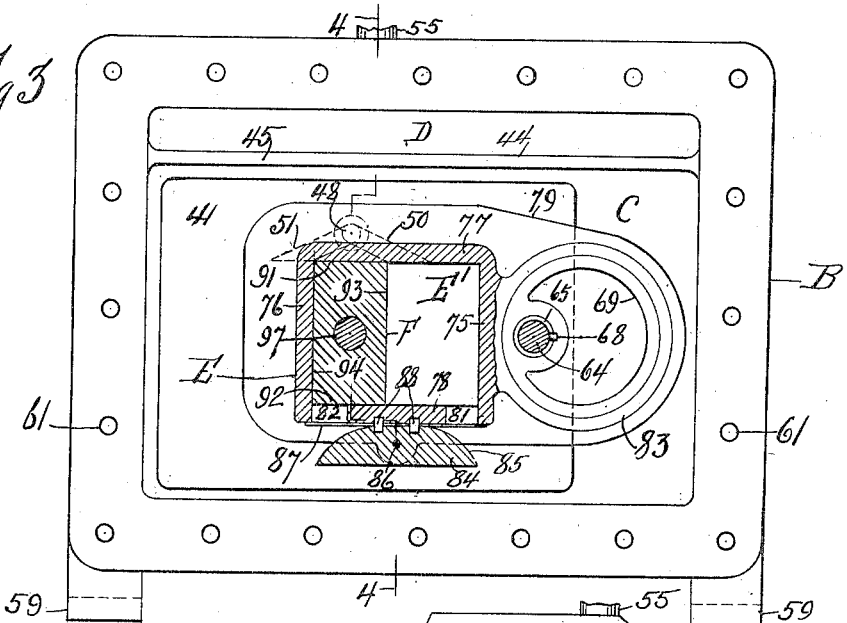

UNITED STATES PATENT OFFICE.

CHARLES D. HAVENSTRITE, OF CHICAGO, ILLINOIS.

OSCILLATING-TYPE COMPRESSOR.

1,346,404.  Specification of Letters Patent.  Patented July 13, 1920.

Application filed July 30, 1918. Serial No. 247,369.

*To all whom it may concern:*

Be it known that I, CHARLES D. HAVENSTRITE, a citizen of the United States, and resident of Chicago, in the county of Cook and State of Illinois, have invented certain new and useful Improvements in Oscillating-Type Compressors, of which the following is a specification.

This invention relates to a compressor having an open-sided oscillating and reciprocating cylinder with an oscillating piston. A housing is provided inclosing the cylinder with its piston, and contains a liquid lubricant to submerge all the moving elements in the said housing. The opposite sides of the cylinder have openings and bear against the accompanying side faces of the housing. The compressor cylinder is characterized by the absence of suction valves and the impossibility of any part working loose. The stuffing box of the compressor is always packed against the lubricant in the housing and not against the gas, and will remain tight for a long period, because a packing box can more easily be packed against a liquid than a gas. The discharge from the cylinder flows into the lubricant in the housing, and there is thereby removed the atomizing effect produced by a gas discharged from a cylinder by means of small ports or valves, and thereby the amount of lubricant discharged through the discharge pipe of the compressor is reduced to a minimum.

The compressor is designed to be air cooled by means of fan blades incorporated in its pulley or fly wheel, or an additional fan arrangement is provided to circulate air against the outside faces of the housing. The compressor, however, may be placed in a pan through which water may be circulated. Water may also be poured over the outside of the housing to cool the compressed gas. Air cooling will be sufficient if ethylchlorid is used in the compressor and for which the machine is specially adapted.

The flooded system of lubrication used will prevent leakage of gas into the chamber of the cylinder, as the pressure maintained in the housing will force the lubricant between all the moving parts therein.

The compressor is generally operated with a pressure of about twenty five pounds per square inch in the housing, and a vacuum of about fifteen inches in the suction port. With these unbalanced pressures there will result pressure on the cylinder to force it against the side of the housing having the suction port formed therein. This produces with the lubricant the requisite seal between the cylinder and the face of the housing containing the suction port, and prevents any excessive leakage of the lubricant into said port. The amount of pressure between the said coacting face of the housing and cylinder may be varied by varying the area of the said suction port.

With this compresser there is obtained a refrigerating apparatus for household use, which is free from gas leakage and odor, quiet in operation and which can be taken care of by unskilled labor.

In the accompanying drawings Figure 1 represents a front elevation of an oscillating type compressor exemplifying the invention; Fig. 2 shows a plan view and partial section of Fig. 1 on the line 2, 2; Fig. 3 represents an inside view of the rear half of the housing of the compressor and a partial section of Fig. 2 on the line 3, 3, with the cylinder at one end of its stroke; Fig. 4 shows a section as on a broken line 4, 4, of Fig. 3; Fig. 5 is a fragmentary portion of the rear half of the housing with the cylinder located in the middle of its stroke; Fig. 6 shows a top plan view and partial section as on the broken line 6, 6, of Fig. 5, and Fig. 7 shows a view similar to Fig. 2 with a slight modification.

A housing is shown consisting of the cup shaped front portion A and the cup shaped rear portion B, with the compression chamber C between them. The front portion A comprises the wall 20 with the top flange 21, the bottom flange 22 and the side flanges 23 and 24. A stuffing box 27 extends from the wall 20 and is provided with the tubular gland 28 and screw cap 29. From the inner side of the wall 20 extends the bearing face 30. A boss 31 and legs 32 are formed with the wall 20. A separating shelf 33 extends from the inside face of the wall 20 to within a short distance of the plane of the face of the flanges formed with said wall. An inlet port 34 is formed in the flange 24 for the lubricant inlet pipe 35.

The rear portion B of the housing comprises the wall 36, with the top flange 37, bottom flange 38, and the side flanges 39 and 40. From the inner face of the wall 36 extends the bearing face 41. A separating shelf 44 extends from the inner face of the wall 36. The shelves 33 and 44 have formed between their accompanying edges the separating port 45 and form with the upper portions of the housing the gas separating chamber D. An inlet port 48 is formed in the rear portion B of the housing for the gas refrigerant pipe 49, and extends to the compression chamber C of the compressor. Branch inlet ports 50 and 51 are formed in the face 41 and connect with the port 48. A discharge port 54 extends through the flange 37 and connects with the separating chamber D. A discharge pipe 55 connects with the port 54. A pair of hubs 57, 58 and legs 59 are formed with the wall 36. Bolts 60 extend through openings 61 in the portions of the housing to clamp them together and a packing 62 between said housings prevents leakage and provides means to adjust the distance between the bearing faces 30 and 41 and the cylinder to be described.

A driving shaft 64 has formed therewith the enlarged portion 65. One end of the shaft is supported in a cavity 66 in the boss 57 and the shaft is also supported in an opening 67 in the wall 20. The shaft 64 has fastened thereto, by means of the key 68, the eccentric 69, which is located within the housing of the compressor. A combined pulley and fan wheel is shown with the rim 73 and the blades 74. An open sided oscillating and reciprocating cylinder E has formed therewith the end walls 75, 76, the top wall 77 and the bottom wall 78. Side bearing walls 79 and 80 extend outwardly from said walls 75 to 78 on the opposite sides thereof, to form the cylinder E having the chamber $E^1$ with open sides. Discharge ports 81 and 82 are formed in the bottom wall 78. An eccentric strap 82 extends from the wall 75. A valve cap 84 has formed therewith the curved top face 85 and is pivoted to the side bearing walls 79 and 80 by means of the pin 86. A spring plate valve 87 normally bears up against the bottom face of the wall 78 to close the ports 81 and 82. Pins 88 extend through the plate valve 87 and engage cavities in the wall 78 and in the valve cap 84. A piston F with the top flat face 91, bottom flat face 92, end flat faces 93, 94 and flat side faces 95 and 96 is pivoted on the spindle 97 that is supported in cavities in the bosses 31 and 58.

In the modification shown in Fig. 7 the housing is modified as follows: The front portion comprises the wall 100 devoid of the flanges 21 to 24. The rear portion of the housing comprises the wall 101, devoid of the flanges 37 to 40. A rectangular central portion 102 is located between the walls 100 and 101. Packing 104 is located between an end face of the central portion 102 and the wall 100 and packing 105 is located between the opposite face of the central portion 102 and the wall 101. An inlet port $34^a$ is formed in the central portion 102 for the lubricant inlet pipe 35 and all the other elements indicated on the modification are the same as those already described. To operate the compressor the chamber C has introduced therein the requisite amount of a liquid lubricant, through the pipe 35, and the pulley having the rim 73 is turned in the direction of the arrow J by means of a belt not shown. The coaction of the eccentric 69, with the eccentric strap 83 of the cylinder E has moved the latter to its central position as shown in Fig. 5, in the direction of the arrow G, and has oscillated the said cylinder from its normally horizontal position to the angular position shown. At the beginning of the stroke the wall 75 of the cylinder E was practically adjacent to the end face 93 of the piston F. Also the piston F was located with its end faces 93 and 94 in vertical planes. The cylinder E in its mid stroke with the said piston F has been oscillated to the position shown in said Fig. 5 and the open side $79^a$ of the cylinder has uncovered the branch inlet port 50 to the extent shown. The said branch port 50 begins to be uncovered simultaneously with the movement of the cylinder E, in the direction of the arrow G and remains uncovered until the completion of the stroke of the cylinder in said direction until the piston F is in the position shown in Fig. 3. In the latter position of the cylinder E, its longitudinal axis is again in its normally horizontal position. Upon the further rotation of the shaft 64 the cylinder E is moved to the other end of its stroke, oscillating in the opposite direction to uncover the branch port 51. When the cylinder moves in the direction of the arrow G the port 81 remains closed by virtue of the tension of the spring plate valve 87, but the port 82 is opened to discharge the compressed gas in the chamber $E^1$ of the cylinder E. When the cylinder moves in the opposite direction the port 81 is opened to discharge compressed gas from the cylinder into the chamber C. The gas percolates through the lubricant in the chamber C, flows through the port 45 into the gas separating chamber D. From the latter the gas is discharged by the discharge pipe 55.

Having described my invention what I desire to secure by Letters Patent and claim is:

1. In a compressor the combination of a housing forming a compression chamber, an inlet and a discharge port in the housing for the chamber, an oscillating and reciprocating cylinder in the chamber, a pivoted piston in the cylinder and oscillating therewith, a discharge valve for the cylinder, and means to simultaneously oscillate and reciprocate the cylinder to cause gas to flow therein from said inlet port and to be discharged from said cylinder after compression therein and flow into the compression chamber.

2. In a compressor the combination of a housing forming a compression chamber, inlet ports and an outlet port in the housing for the chamber, an oscillating and reciprocating cylinder in the chamber, an oscillating piston in said cylinder and means to move the cylinder to bring each of the inlet ports into connection with the interior of the cylinder.

3. In a compressor the combination of a housing forming a compression chamber, an inlet port with a pair of branch ports in the housing and extending to the chamber, an outlet port in said housing for the chamber, a cylinder having a discharge port at each end and having an eccentric strap formed therewith in the chamber, a driving shaft extending through the chamber, an eccentric fastened to the shaft and engaging said eccentric strap, a spindle extending through the cylinder and chamber and a piston in the cylinder oscillating on said spindle.

4. In a compressor the combination of a housing forming a compression chamber, a gas separating chamber above the compression chamber with a port connecting the chambers, an inlet port for a fluid in the housing, a pair of branch ports formed on the inner face of a wall of the housing connecting with the inlet port, a driving shaft extending through the compression chamber and supported in the walls of the housing, an eccentric in the compression chamber fastened to the driving shaft, an opensided cylinder in the compression chamber having an eccentric strap at one end thereof, the said strap engaging said eccentric, the sides of the cylinder bearing against a pair of opposite side faces of the compression chamber and one of said sides alternately uncovering the said branch ports during the movements of the cylinder, a spindle extending through the open sides of the cylinder and a piston in the cylinder with its side faces bearing against the said opposite side faces of the compression chamber and oscillating on said spindle.

5. In a compressor the combination of a housing forming a compression chamber, an inlet port and an outlet port for the chamber, an opensided oscillating and reciprocating cylinder in the chamber, the open sides of the cylinder covered by a pair of opposite inside faces of the housing, an oscillating piston pivoted in the cylinder and means to actuate the cylinder and thereby permit an inflow of a fluid therein, to compress it in the cylinder and discharge it therefrom.

6. In a compressor the combination of a housing forming a chamber, an inlet port for the chamber, a pair of branch ports formed in an inner face of one of the walls of the chamber connecting with said inlet port, an opensided oscillating and reciprocating cylinder in said chamber with its sides bearing against the inner faces of the chamber, a discharge port for the chamber, a piston in the cylinder, exhaust valves for the cylinder and means to move the cylinder so that one of its open sides alternately opens said branch ports, the discharge valves of the cylinder opening when a predetermined gas pressure has been obtained therein.

7. In a compressor the combination of a housing forming a chamber, a discharge port for the chamber, an inlet port for the chamber, a pair of branch ports formed in an inner face of one of the walls of the chamber connecting with said inlet port, an opensided cylinder in said chamber with one of its sides contacting against said inner face of the chamber having the branch ports and the other side of the cylinder bearing against the inner face of the opposite wall of the chamber, a piston in the cylinder, a spring plate valve with its end portions normally covering a pair of discharge ports of the cylinder, and a valve cap fastened to the cylinder with its central portion bearing against said spring plate valve.

8. In a compressor the combination of a housing consisting of a wall with flanges forming a cup shaped front portion, a second wall with flanges forming a cup shaped rear portion, bolts connecting the portions, packing between the adjoining faces of the flanges of the said portions to prevent leakage from the chamber formed by the portions and to adjust the distance between the inner faces of said walls, an inlet port having branches and a discharge port for the housing, an oscillating and reciprocating cylinder in said chamber coacting with the branches of the inlet port to charge said cylinder, discharge valves for the cylinder to discharge the fluid operated upon from the cylinder into said chamber and a pivoted piston in the cylinder oscillating therewith.

9. In a compressor the combination of a housing consisting of a cup shaped front portion and a cup shaped rear portion, means to clamp the portions together to form a tight joint between them and to form a chamber for a fluid and for oil to submerge the elements in the housing in said oil, a bearing face on each of a pair of the opposite inner faces of the walls of the housing, an opensided cylinder in the housing with its opposite sides bearing against said bearing faces, said bearing faces performing the function of sides for the cylinder, an inlet port for the housing, a discharge port for the housing, a discharge port for the cylinder, a pivot extending through the said chamber and cylinder, a piston in the cylinder pivoted on the pivot and means to move the cylinder to cause one of its open sides to coact with said inlet port to charge said cylinder with a fluid to be compressed.

10. In a compressor the combination of a housing having separating shelves within the same and having a port formed between the said shelves, a compression chamber for the moving elements of the compressor being formed on one side of said shelves and a gas separating chamber formed on the other side thereof, bearing faces on the inner opposite faces of the walls of the compression chamber, a driving shaft extending from the outside of the housing through the compression chamber, an eccentric in the chamber fastened to said shaft, an open sided cylinder in the compression chamber with its sides bearing against said bearing faces, an eccentric strap formed with the cylinder and engaging said eccentric, a spindle extending through the cylinder, a piston for the cylinder pivoted on said spindle, an inlet port for the operating chamber, branches extending from the inlet port and formed in one of said bearing faces to coact with one of the open sides of the cylinder to charge the same with a fluid, a spring plate valve with its central portion attached to a wall of the cylinder and on the outside thereof and a valve cap with a curved top face secured to the cylinder to hold the plate valve in place, the latter coacting with a pair of discharge ports of the cylinder.

11. In a compressor the combination of separable portions constituting a housing to form a chamber, means between portions of the housing to pack the joint between them and to adjust the distance between a pair of opposite faces in said housing, means to clamp the portions of the housing together, an inlet port and an outlet port for the housing, an oscillating and reciprocating cylinder in said housing with a pair of its opposite sides contacting with said opposite sides of the housing and coacting with said ports and an oscillating piston in the cylinder.

12. In a compressor the combination of a housing forming a chamber for a fluid, and also for a lubricant to submerge operative elements contained in the chamber in said lubricant, a bearing free on each of a pair of opposite inner faces of the walls of the housing, an opensided cylinder in the housing with its opposite sides bearing against said bearing faces, said bearing faces performing the functions of sides for the cylinder, an inlet port for the housing, a discharge port for the housing, a pair of discharge ports for the cylinder, an oscillating and otherwise stationary piston in the cylinder and means to move the cylinder to cause it to coact with said inlet port to charge said cylinder with the fluid and compress the same and then discharging the compressed fluid from said cylinder.

Signed at Chicago, in the county of Cook, and State of Illinois this eleventh day of July, A. D. 1918.

CHARLES D. HAVENSTRITE.

Witnesses:
H. C. DUNBAR,
HARRY KROHN.